(12) United States Patent
Fagans et al.

(10) Patent No.: US 7,561,157 B2
(45) Date of Patent: Jul. 14, 2009

(54) COMPARE MODE FOR VARIABLE NUMBER OF IMAGES

(75) Inventors: Joshua Fagans, Redwood City, CA (US); Timothy Benjamin Martin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 420 days.

(21) Appl. No.: 11/329,330

(22) Filed: Jan. 9, 2006

(65) Prior Publication Data

US 2006/0119619 A1    Jun. 8, 2006

(51) Int. Cl.
*G06T 15/00* (2006.01)
(52) U.S. Cl. .................... 345/440; 345/619; 345/660
(58) Field of Classification Search ................. 345/619, 345/660, 440
See application file for complete search history.

(56) References Cited

U.S. PATENT DOCUMENTS

| | | | |
|---|---|---|---|
| 4,343,037 A | 8/1982 | Bolton | |
| 5,083,860 A | 1/1992 | Miyatake et al. | |
| 5,559,707 A | 9/1996 | DeLorme et al. | |
| 5,636,036 A | 6/1997 | Ashbey | |
| 5,638,523 A | 6/1997 | Mullet et al. | |
| 5,675,358 A | 10/1997 | Bullock et al. | |
| 5,802,492 A | 9/1998 | DeLorme et al. | |
| 6,005,679 A | 12/1999 | Haneda | |
| 6,085,112 A | 7/2000 | Kleinschmidt et al. | |
| 6,101,431 A | 8/2000 | Niwa et al. | |
| 6,111,586 A * | 8/2000 | Ikeda et al. | 345/619 |
| 6,184,823 B1 | 2/2001 | Smith et al. | |
| 6,321,158 B1 | 11/2001 | DeLorme et al. | |
| 6,509,912 B1 | 1/2003 | Moran et al. | |
| 7,096,117 B1 | 8/2006 | Gale et al. | |
| 7,099,882 B2 | 8/2006 | McDonough | |
| 7,164,423 B1 | 1/2007 | Westen | |
| 2001/0014184 A1 | 8/2001 | Bubie et al. | |
| 2002/0008721 A1 | 1/2002 | Fahraeus et al. | |
| 2002/0158973 A1 | 10/2002 | Gomi | |
| 2002/0191867 A1 | 12/2002 | Le et al. | |

(Continued)

FOREIGN PATENT DOCUMENTS

EP    0990996 A    4/2000

(Continued)

OTHER PUBLICATIONS

European Patent Office, "Communication pursuant to Article 96(2) EPC", Foreign Application No. PCT/US2005/035938, 7 pages, 2005.

(Continued)

*Primary Examiner*—Phu K Nguyen
(74) *Attorney, Agent, or Firm*—Hickman Palermo Truong & Becker LLP

(57) ABSTRACT

A technique for displaying a variable number of images on a display, such that a portion of the display contains the thumbnail images representing the library of images currently in use. A user selects a number of thumbnails, and another, often larger, portion of the screen, displays the underlying images of the selected thumbnails. The images are displayed on the screen in proximity to facilitate the comparison of the images, and the size of the displayed images is based upon the size of the portion of the screen and the number of images displayed.

27 Claims, 6 Drawing Sheets

U.S. PATENT DOCUMENTS

| | | | |
|---|---|---|---|
| 2003/0084065 | A1 | 5/2003 | Lin et al. |
| 2003/0095697 | A1 | 5/2003 | Wood et al. |
| 2003/0123713 | A1 | 7/2003 | Geng |
| 2003/0179154 | A1 | 9/2003 | Demsky et al. |
| 2003/0189602 | A1 | 10/2003 | Dalton et al. |
| 2003/0223650 | A1 | 12/2003 | Kim |
| 2003/0227468 | A1 | 12/2003 | Takeda |
| 2004/0024758 | A1 | 2/2004 | Iwasaki |
| 2004/0111332 | A1 | 6/2004 | Baar et al. |
| 2004/0228504 | A1 | 11/2004 | Chang |
| 2004/0240709 | A1 | 12/2004 | Shoemaker |
| 2005/0134610 | A1 | 6/2005 | Doyle et al. |
| 2007/0035551 | A1 | 2/2007 | Ubillos |

FOREIGN PATENT DOCUMENTS

| | | |
|---|---|---|
| EP | 1 369 792 A2 | 12/2003 |
| GB | 2310988 A | 9/1997 |
| WO | WO 93/22738 A | 11/1993 |
| WO | WO 93/22738 A1 | 11/1993 |

OTHER PUBLICATIONS

Claims, Foreign Application No. PCT/US2005/035938, 4 pages, 2005.

International Business Machines Corporation, "Automated/customized method for window tiling", Research Disclosure Database No. 444135, published Apr. 2001, 3 pages.

European Patent Office, "Communication pursuant to Article 96(2) EPC", Foreign Application No. PCT/US2005/035943, 8 pages.

Claims, Foreign Application No. PCT/US2005/035943, 5 pages.

Apple Computer, Inc., "A 'Pile' Metaphor for Supporting Casual Organization of Information", ACM CHI '92, published May 1992, 8 pages.

European Patent Office, European Search Report, App. No. 05256232.9, received Mar. 9, 2006, 9 pages, 2006.

Current Claims, EP App. No. 05256232.9, 6 pages, 2006.

Mander, Richard et al., "A 'Pile' Metaphor for A Supporting Casual Organization of Information," Striking a Balance, May 3-7, 1992, Monterey CA, pp. 627-634, XP00426843.

Graham, Adrian et al., "Time as essence for photo browsing through personal digital libraries", Proceedings of the $2^{nd}$ ACM/IEEE-CS joint conference on Digital libraries JCDL '02, Jul. 2002, 10 pages.

Rodden, Kerry, et al., "How do people manage their digital photographs?", Proceedings of the SIGCHI conference on Human factors in computing systems CHI '03, Apr. 2003, 8 pages.

The DragMag image magnifieir Colin Ware, Marlon Lewis May 1995 Conference companion on Human factors in computing systems CHI '95 Publisher: ACM Press 1995.

A magnifier tool for video data Michael Mills, Jonathan Cohen, Yin Yin Wong Jun. 1992 Proceedings of the SIGCHI conference on Human factors in computing systems CHI '92 Publisher: ACM Press 1992.

Branscombe, Mary, "Getting to know XP Multimedia", PC Answer, XP-002330622, dated May 2002, 3 pages.

* cited by examiner

COMPARE MODE FOR VARIABLE NUMBER OF IMAGES

CROSS-REFERENCE TO RELATED APPLICATIONS

This application is related to prior U.S. patent application Ser. No. 10/960,163, filed on Oct. 6, 2004, by Randy Ubillos and Laurent Perrodin, entitled "Viewing Digital Images Using a Floating Controller," this application is also related to prior U.S. patent application Ser. No. 10/960,339, filed on Oct. 6, 2004, by Randy Ubillos and Stan Jirman, entitled "Viewing Digital Images on a Display Using a Virtual Loupe," prior U.S. patent application Ser. No. 10/960,888, filed on Oct. 6, 2004, by Randy Ubillos, Laurent Perrodin, Dan Waylonis, Stan Jirman, Sarah Brody and Mike Mages, entitled "Displaying Digital Images using Groups, Stacks, and Version Sets," and prior U.S. patent application Ser. No. 10/960,887, filed on Oct. 6, 2004, by Randy Ubillos, Laurent Perrodin and Dan Waylonis, entitled "Techniques for Displaying Digital Images on a Display."

FIELD OF THE INVENTION

The present invention relates to displaying digital images on a display.

BACKGROUND

Digital photographers may use a software system in managing and organizing digital images. Often, digital photographers may need to display a large number of digital images on a display. The number of digital images that the digital photographer wishes to visually represent on the display may be too large or unwieldy for each of the digital images to be visually represented on the display unobstructed. Consequently, there is a need in the art to improve the display, management, and organization of digital images shown on a display.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Figure 1:
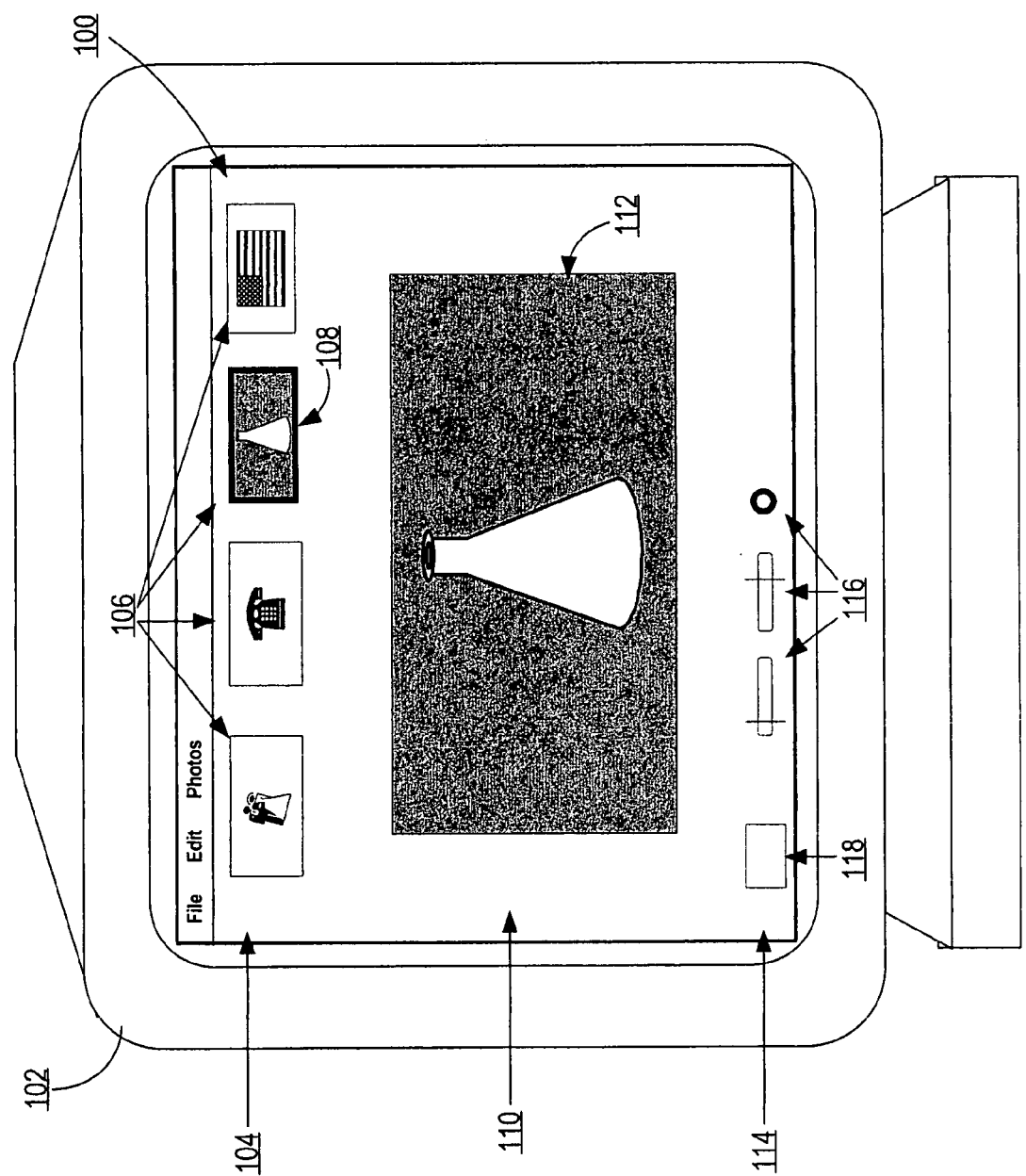
FIG. 1 is an illustration of a display of a digital image system according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

A digital image system includes a computer system, a primary display device, and one or more secondary display devices. The computer system displays content on a primary display device and potentially one or more secondary display devices.

It is understood that in the preferred embodiment of the invention, actual digital images may be graphically represented by small likenesses, or representations of the actual digital images, called "thumbnail" images. Because the actual images are almost always larger than their thumbnail images, the use of thumbnails allows a user to see and operate upon a larger subset of the image library than would be possible if the images were displayed at full size.

According to an embodiment, the digital image system may operate in a first mode and a second "comparative" mode. According to an embodiment, if the digital image system is in the first mode, then the digital image system may display thumbnail images representing the library of images currently in use, along with at least one of the underlying digital images. A user may click on or otherwise select a thumbnail image and issue a command which displays the underlying image. Unlike the second mode, the thumbnails are not displayed in a manner conducive to comparison, nor are the thumbnails automatically resized and arranged in a manner conducive to comparison.

According to an embodiment, if the digital image system is in the second mode, a first portion of the display contains the thumbnail images representing the library of images currently in use. A user selects a number of thumbnails, and another, often larger, second portion of the screen displays the underlying images of the selected thumbnails. The images are displayed on the screen in proximity to facilitate the comparison of the images, and the size of the displayed images is based upon the size of the second portion of the screen and the number of images displayed.

According to an embodiment, one or more of the displayed images may be selected such that any operations will be applied to the selected images. For example, if eight images are displayed in the second mode, one of the images may be selected such that editing commands will alter the image. According to an embodiment, this selection is indicated using a visual indicator surrounding the selected image.

The user may cause the digital image system to switch between the first mode and the second mode by submitting user input to the computer system. According to one embodiment, returning to the first mode causes the images displayed for comparison to disappear.

COMPARE MODE FOR VARIABLE NUMBER OF IMAGES

FIG. 1 illustrates an embodiment of the invention. In FIG. 1, the digital image system 100 is in a first mode of operation. According to an embodiment of the invention, the computer display 102 has a first portion 104 wherein representations of a plurality of digital images 106, or thumbnails, are displayed. A user may select one of the thumbnails 106, in one embodiment the selection being indicated by a visual indicator 108 such as a colored border or highlight, according to an embodiment.

According to an embodiment, the computer display has a second portion 110 within which the digital image 112 represented by the selected thumbnail 106 is displayed. In one embodiment, only one digital image is displayed at a time. According to other embodiments, the entire library of digital images, or merely the images associated with the selected thumbnails, may be displayed in the second portion 110 in the same order as the thumbnails 106 in the first portion 104. The size of the digital images 112 may be changed in response to user input, thereby causing the second portion 110 to display a subset of the image library. In one embodiment, the computer display has a third portion 114 within which may be located various image editing and manipulation tools 116, in addition to a button 118 or similar Graphical User Interface (GUI) element which may be used to toggle between a first and a second mode of operation.

Figure 2:
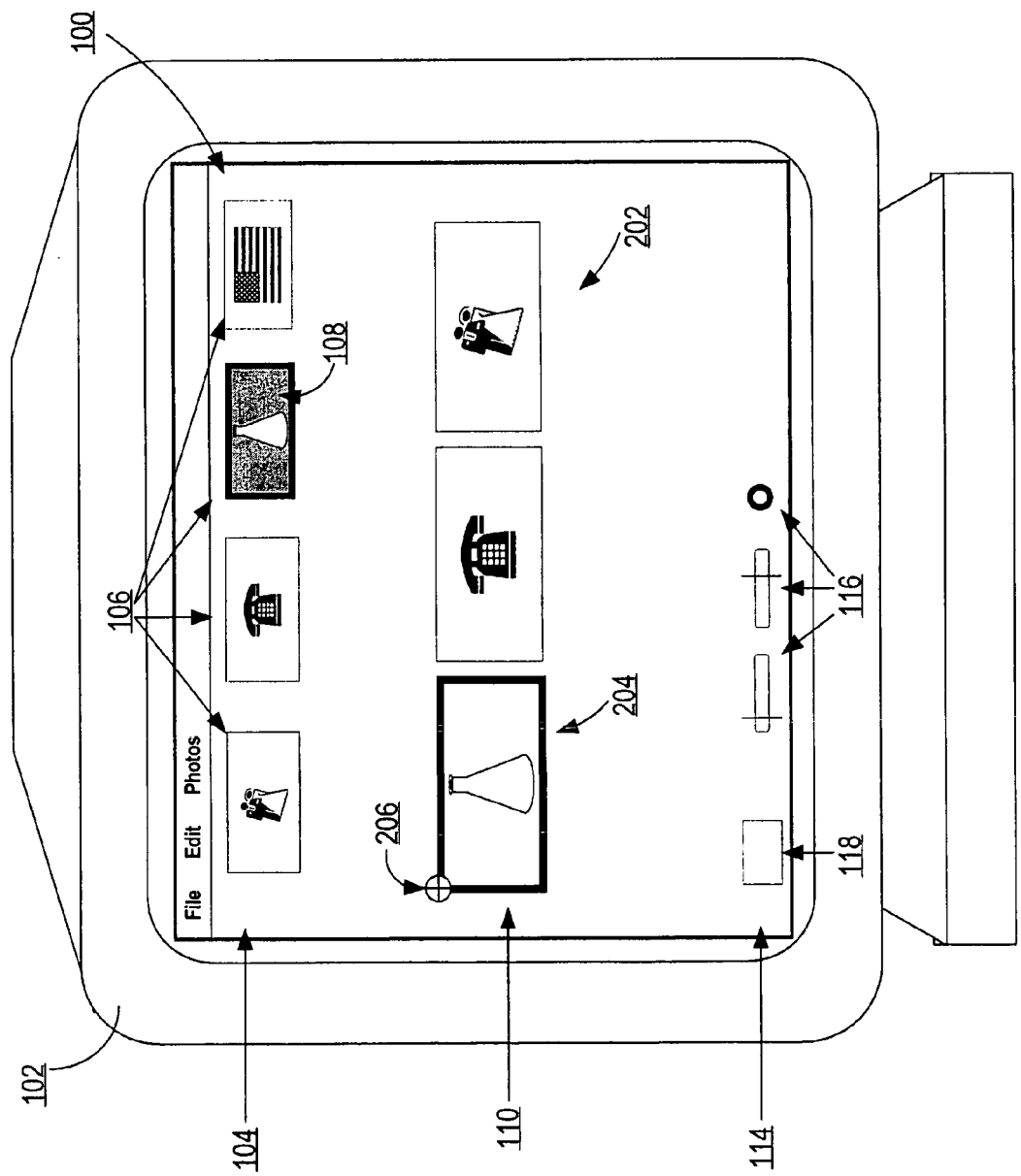
FIG. 2 is an illustration of a display of a digital image system according to an embodiment.

FIG. 2 illustrates an embodiment of the invention. In FIG. 2, the digital image system 100 is in a second mode of operation. According to an embodiment, a button 118 or similar GUI element may be used to toggle between the first and second modes of operation. According to an embodiment, in the second mode of operation, the computer display 102 maintains the first portion 104 wherein representations of a plurality of digital images 106, or thumbnails, are displayed. In the second portion 110 are displayed the images 202 selected for comparison. The comparison images 212 are resized and arranged in proximity, such that the comparison images 202 take up a majority of the space available in the second portion 110 and are placed close to each other, facilitating comparison. In one embodiment, if four images were selected for comparison, the images would be arranged in a 2×2 grid. In one embodiment, if eight images were selected for comparison, the images would be arranged in a 4×4 grid. According to one embodiment, the images are displayed at equal size and in an evenly spaced arrangement.

According to an embodiment, activating the compare mode causes the first and third portions of the screen to slide out of view, thereby maximizing the available area for display of the selected images. In one embodiment, the second area would comprise the entire screen.

According to an embodiment, at least one of the comparison images 202 may be selected, such that editing and manipulation actions will affect the selected images. In the preferred embodiment, only one of the comparison images 202 is so selected. In one embodiment, the image associated with the first-selected thumbnail is selected by default. This selection may be indicated by a visual indicator 204 such as a highlight or enhanced border, or any number of techniques known in the art.

According to one embodiment, user input may be received such that the selected image is replaced with another image from the library without leaving the second mode of operation or causing the comparison images 202 to be rearranged or resized. In one embodiment, a close box 206 or similar GUI element is placed on or near the selected images. If a user clicks on the close box 206, the image is removed from the second portion 110 and from comparison and the remaining comparison images are resized and rearranged to maximize the visible area in the second portion 110.

Figure 3:
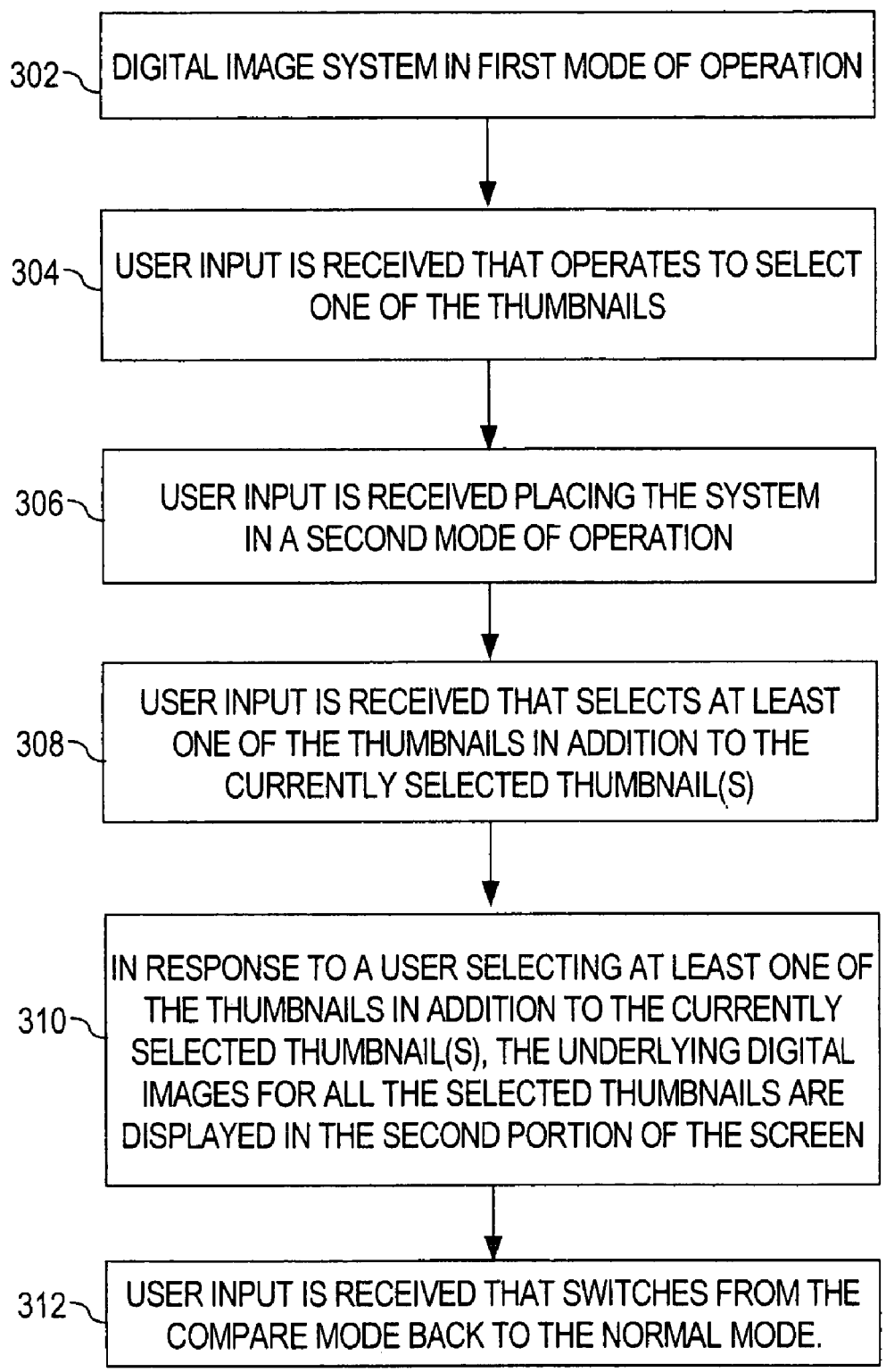
FIG. 3 is a flowchart depicting the procedure for using a compare mode for a variable number of images, according to one embodiment of the invention.

FIG. 3 is a flowchart 300 illustrating the steps of using a compare mode for a variable number of images, according to one embodiment of the invention. In step 302, the digital image system is in a first mode of operation, or "normal" mode. According to an embodiment, this mode is the standard mode of operation wherein the display is divided into three (3) portions. The first portion displays the thumbnail images representative of the collection of images currently being worked with, the second portion displays the actual images, and the third portion displays various tools for mode selection and image editing. Embodiments are contemplated with any number of portions.

According to one embodiment, the first and/or third portions are displayed as a toolbar, with the thumbnails displayed in the first portion toolbar. This toolbar may be displayed at all times, or may slide in and out of view based upon user input such as holding a mouse pointer over the first portion of the screen for a predetermined length of time. According to an embodiment, if the toolbar is displayed and the pointer is moved off the toolbar for a predetermined length of time, the toolbar slides out of view. In another embodiment, one or both of the toolbars slide out of view upon entering compare mode.

Continuing with step 304 of FIG. 3, while the system is in a first mode, user input is received that operates to select one of the thumbnails. For example, a user could click on one or more of the thumbnails. In an embodiment, this user input could consist of holding down a modifier key and then clicking on a thumbnail. In an embodiment, multiple thumbnails are selected by holding down the COMMAND key and clicking the mouse pointer on each thumbnail to be selected. Other types of user input, well known in the art, may be utilized to select one or more thumbnails. This type of user input is contemplated for all embodiments as well.

According to an embodiment, once a thumbnail is clicked upon, a visual indicator is provided to designate the thumbnail as selected. Visual indicators could consist of highlighting the thumbnail in any number of colors, numbering the images, placing a prominent border around the thumbnail, utilizing an animation such as a "marching ants" effect around the thumbnail, or any number of visual techniques. In response to clicking a thumbnail, the underlying digital image may be displayed in the second portion of the screen, as illustrated in FIG. 1. In the case of multiple thumbnails being selected, the underlying digital images for all the selected thumbnails may be displayed in the second portion of the screen. According to an embodiment, the size of these images may be adjusted automatically or in response to user input. For example, a slider may be utilized to change the size of the images dynamically, such that any one of the images fills the second portion of the screen or all of the images fit within the second portion.

In step 306 of FIG. 3, user input is received placing the system in a second mode of operation, or "compare" mode. According to an embodiment, this input consists of a user clicking a button or similar GUI element located in the third portion of the screen. Other embodiments exist where the compare mode is entered in response to a menu selection, keypress, or any combination of user input.

In step 308 of FIG. 3, while in the compare mode, user input is received that selects at least one of the thumbnails in addition to the currently selected thumbnail(s). In one embodiment, only one additional thumbnail is selected, but other embodiments exist where any number of thumbnails may be selected at one time. According to an embodiment, multiple thumbnails may be selected using a combination of a keypress and mouse clicks, although alternate methods of selection such as keypresses alone, clicking alone, voice command, or any combination of conceivable user inputs is operational to select multiple thumbnails.

In step 310 of FIG. 3, in response to a user selecting at least one of the thumbnails in addition to the currently selected thumbnail(s), the underlying digital images for all the selected thumbnails are displayed in the second portion of the screen. According to an embodiment, the images are automatically arranged and dynamically resized to maximize the size of the images within the available display area of the second portion, as illustrated in FIG. 2. In an embodiment, the images may be disparate sizes, such as having one image larger than the rest. This may be accomplished through user input. According to an embodiment, the images are placed in proximity to one another to facilitate comparison. According to an embodiment, one or more of the images may be selected, such that further action may be taken that affects the selected image(s) and not the unselected images. According to an embodiment, this selection is indicated with a visual technique consisting of highlighting the image in any number of colors, placing a prominent border around the image, utilizing an animation such as the "marching ants" effect around the image, or any number of visual techniques.

According to an embodiment, a GUI element that is placed in proximity to each selected image operates to remove the image from the second portion in response to user input. According to an embodiment, this GUI element is a "close box" that may take any number of forms. Clicking on the "close box" would remove the image associated with that instance of the "close box" from the second portion of the display. According to an embodiment, the remaining images would be automatically arranged in proximity and dynamically resized to maximize the size of the remaining images within the available display area of the second portion.

According to an embodiment, after the selected images are arranged, resized and displayed in the second portion, a user may click on additional thumbnails. In response, the underlying images will be displayed in the second portion in addition to the currently-displayed images, and the currently-displayed images will be rearranged and resized to accommodate the newly-displayed images. According to an embodiment, the currently-displayed images "slide" into their new positions. This action may occur any number of times in response to user input.

According to an embodiment, a selected image may be replaced with another image from the library without causing the removal and subsequent resizing and rearranging of the currently-displayed images. According to an embodiment, this is effectuated through user input while at least one of the images displayed for comparison is selected. This user input may consist of any combination of inputs such as key presses, mouse clicks, combinations of key presses and/or mouse clicks, voice commands and the like. According to an embodiment, the image replacing the selected image is the next image in the library, as reflected by the current sort order of the library. Additional user input may be used to advance the selected image to any of the images available in the library.

According to an embodiment, the selected image(s) may be edited or otherwise manipulated using all available features. For example, a user may zoom in on the selected image(s) displayed in the second portion without zooming in on the unselected images. The selected images may have properties adjusted, such as brightness, contrast, or hue, without adjusting the unselected images. According to an embodiment, the modifications are reflected in real time.

In step 312 of FIG. 3, user input is received that switches from the compare mode back to the normal mode. According to an embodiment, this consists of clicking on the same GUI element used to enter compare mode, or any number of input variations. According to an embodiment, switching modes clears the second portion of all images and returns the display to the normal mode as illustrated in FIG. 1.

An example is presented to illustrate the workflow envisioned by FIG. 3. A user has an image library containing 100 digital images. In the normal mode of operation, the 100 images are represented by thumbnails displayed in a first portion of the screen. This first portion may be hidden or visible, or displayed on a toolbar that slides in and out of view in response to user input. In a second portion of the screen, the images in the library are displayed. All 100 images may be displayed by dynamically reducing the size of the images, in response to user input or automatically.

The user selects one thumbnail from the first portion of the screen by clicking on the thumbnail. In response, the underlying image is displayed by itself in the second portion. The image is automatically resized to fit in the second portion if the actual size of the image is too large to display fully in the second portion, but this may be altered by the user.

Desiring to compare the displayed image to another image from the library, the user clicks a "compare" button in the third portion of the screen. In lieu of this specific action, the user may utilize any number of alternate inputs, such as a keypress. In response to this action, the system enters a second mode of operation, the compare mode.

The user then selects at least one thumbnail from the first portion. The user may select the same thumbnail or a different thumbnail. The user may select any number of thumbnails by holding down the COMMAND key and clicking on the thumbnails, although other methods of selecting multiple thumbnails are envisioned. In this example, the user holds down the COMMAND key and selects three thumbnails in addition to the thumbnail already selected.

In response, the four images represented by the selected thumbnails are displayed in the second portion of the screen. The images are dynamically resized such that each image is equal in area. In this example, each image is too large, such that it is impossible to display all four images in the second portion without overlap. Therefore, each image is dynamically resized such that the available area in the second portion is maximally utilized to display the four images. The images are arranged in proximity to facilitate comparison. In this example, the four images are arranged in a 2×2 grid.

In one embodiment, the first and third portions temporarily disappear from the display, such as in the case of toolbars sliding in and out of view in response to user input, thereby maximizing the display area for the second portion, which may then comprise the entire screen.

In this example, any one of the four images may be further selected for manipulation such as editing or zooming. The user accomplishes this by clicking on the images the user desires to select. In one embodiment, the image associated with the first thumbnail selected is automatically selected.

The selected image(s) are indicated by a visual indicator, such as a highlight behind the image, a border around the image, or any number of techniques.

In this example, the user selects one of the images, and the visual indicator appears. The user then manipulates the brightness of the image, and the effect of the manipulation is illustrated in real time while leaving the unselected images unmodified.

The user then desires to replace one of the selected images with another image from the library. The user selects the image, causing the visual indicator to appear, and presses the right arrow key. In response, the digital image next existing in the sort order appears in place of the previous image. While the right arrow key is used in this example, any number and/or combination of user inputs may be used to effectuate the same action, including a mouse click on the specific thumbnail desired. In this example, the user presses the right arrow key ten times, causing the image located ten places away from the original image in the library sort order to appear in the selected area within which the previous image appeared. In one embodiment, the thumbnails in the first portion (if visible) highlight as the images are displayed, reflecting which image in the library is currently being displayed in the selected area. In this example, the number of images displayed in the second portion remains constant, as does their size and position.

In this example, the user then desires to remove one of the images and clicks on the image to be removed. The "close box" GUI element appears as part of the visual indicator that the image has been selected. The user clicks on the "close box," and the image disappears from the second portion of the display. In one embodiment, if the user has made any edits to the image, a dialog box or other alert method asks the user if the changes made to the image should be committed prior to removing the image from the display.

The image disappears and the remaining images are automatically resized and arranged using the same process undertaken to display them previously. The user then desires to add five more images to the second portion in order to compare them. The user holds down the COMMAND key and clicks on five thumbnails, although as discussed previously, any number and/or combination of user input may be used in lieu of this specific example. As each thumbnail is selected, the underlying image is displayed in the second portion and it, along with the already-displayed images, is dynamically resized and arranged in proximity as before.

After the five additional thumbnails are selected, the second portion of the display contains eight images, all resized to fit within the second portion and arranged in proximity for ease of comparison. In this example, the images are arranged in a 4×4 grid.

The user then wishes to exit the compare mode and clicks on the GUI element used to enter compare mode, or the any number of alternate inputs, such as a keypress, available to enter the compare mode. In response, the displayed images are removed from the second portion, and the system returns to the normal mode of operation.

Figure 4:
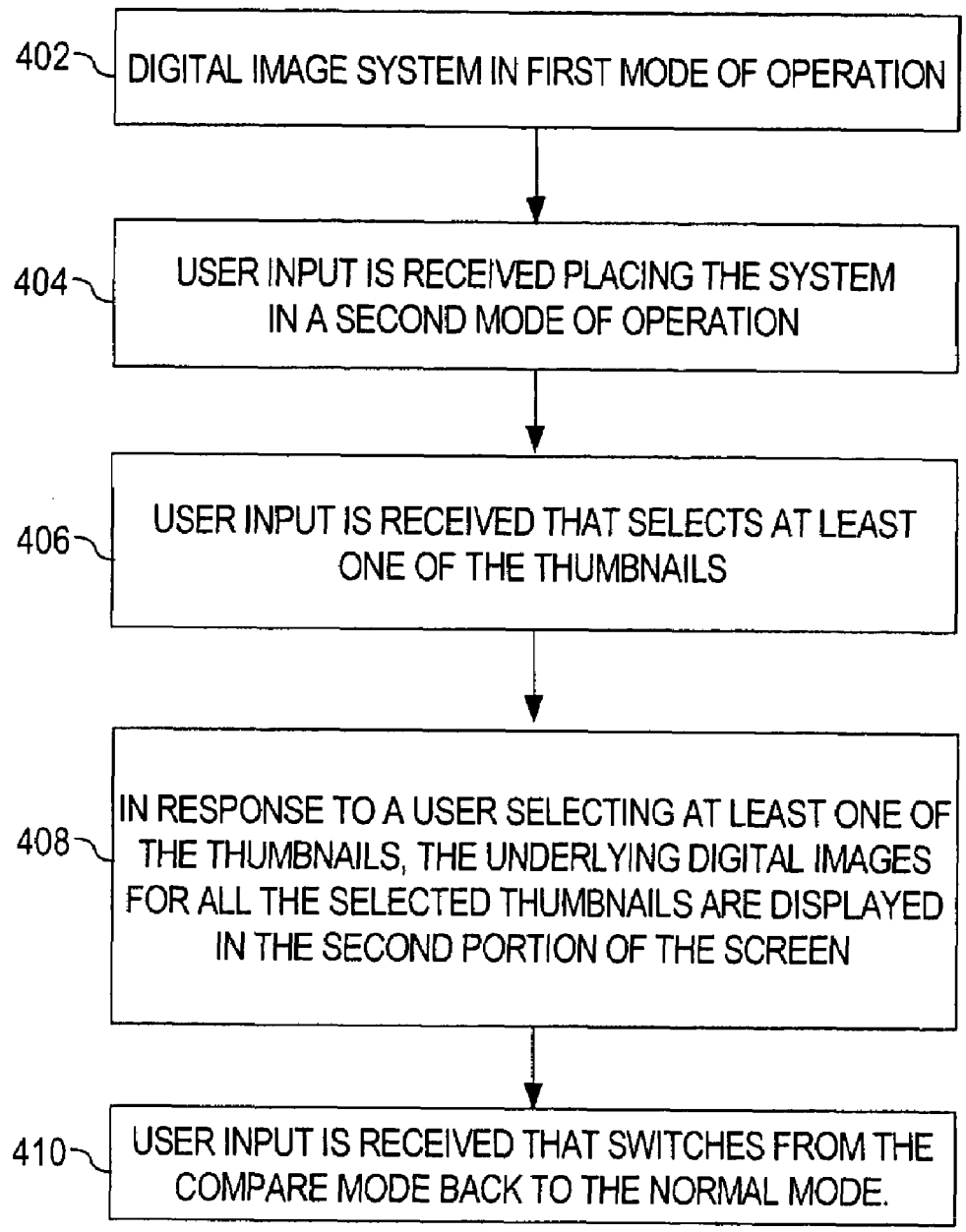
FIG. 4 is a flowchart depicting the procedure for using a compare mode for a variable number of images, according to one embodiment of the invention.

FIG. 4 is a flowchart 400 illustrating the steps of using a compare mode for a variable number of images, according to one embodiment of the invention. In step 402, the digital image system is in a first mode of operation, or "normal" mode. In step 404, user input is received placing the system in a second mode of operation, or "compare" mode. According to an embodiment, this input consists of a user clicking a button or similar GUI element located in the third portion of the screen. Other embodiments exist where the compare mode is entered in response to a menu selection, keypress, or any combination of user input.

In step 406, while in the second mode, user input is received that operates to select at least one of the thumbnails. For example, a user could click on one or more of the thumbnails. In an embodiment, this user input could consist of holding down a modifier key and then clicking on a thumbnail. In an embodiment, multiple thumbnails are selected by holding down the COMMAND key and clicking the mouse pointer on each thumbnail to be selected. Other types of user input, well known in the art, may be utilized to select one or more thumbnails. This type of user input is contemplated for all embodiments as well.

In step 408, in response to a user selecting at least one of the thumbnails, the underlying digital images for all the selected thumbnails are displayed in the second portion of the screen. According to an embodiment, the images are automatically arranged and dynamically resized to maximize the size of the images within the available display area of the second portion, as illustrated in FIG. 2. According to an embodiment, the images are placed in proximity to one another to facilitate comparison. According to an embodiment, the images are placed in an evenly-spaced arrangement. According to an embodiment, as thumbnails are selected and the underlying images are displayed, the currently-displayed images "slide" into their new positions relative to the newly-displayed image.

In step 410 of FIG. 4, user input is received that switches from the compare mode back to the normal mode. According to an embodiment, this consists of clicking on the same GUI element used to enter compare mode, or any number of input variations. According to an embodiment, switching modes clears the second portion of all images and returns the display to the normal mode as illustrated in FIG. 1.

Figure 5:
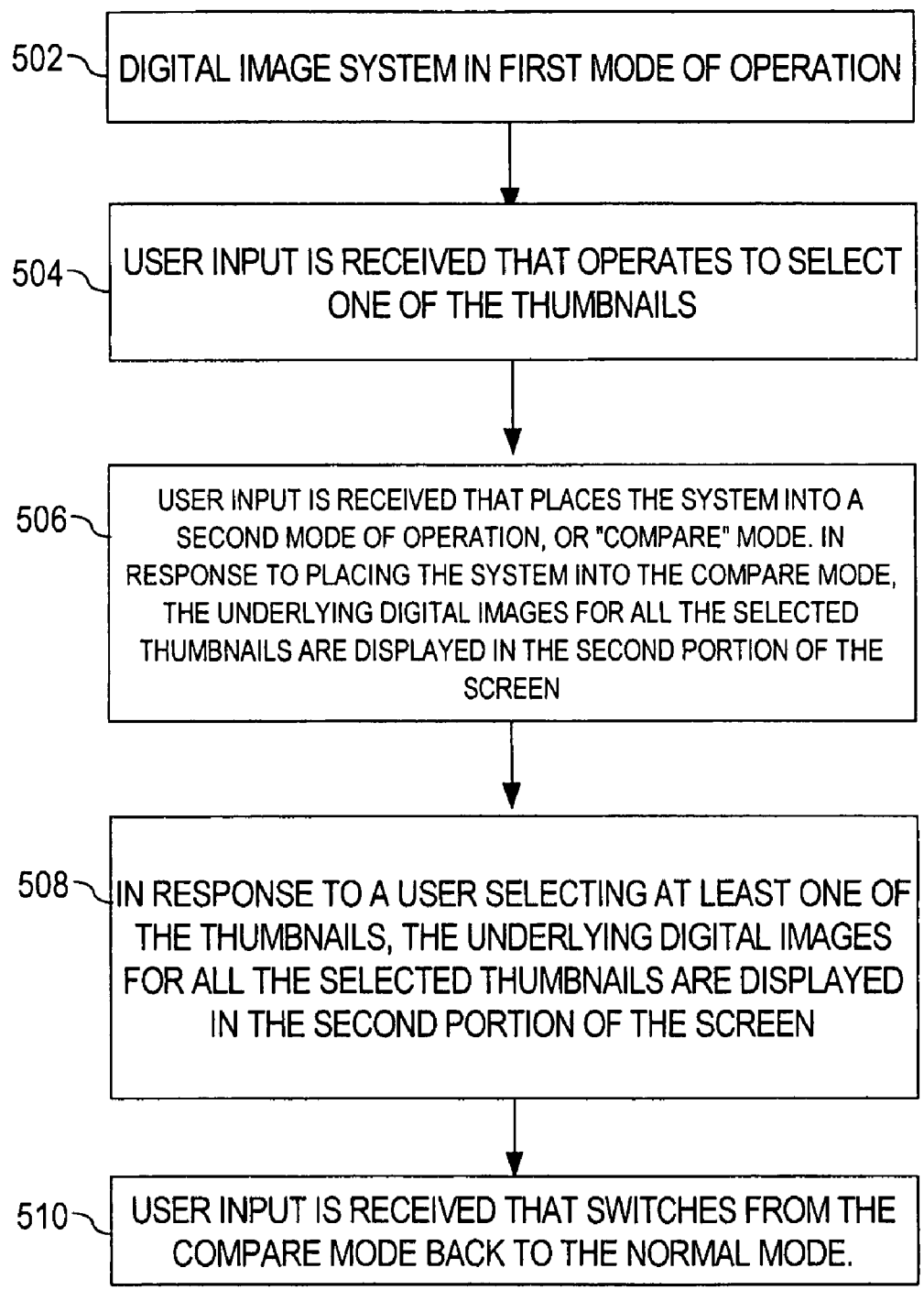
FIG. 5 is a flowchart depicting the procedure for using a compare mode for a variable number of images, according to one embodiment of the invention.

FIG. 5 is a flowchart 500 illustrating the steps of using a compare mode for a variable number of images, according to one embodiment of the invention. In step 502, the digital image system is in a first mode of operation, or "normal" mode. In step 504 of FIG. 5, while the system is in a first mode, user input is received that operates to select one of the thumbnails. For example, a user could click on one or more of the thumbnails. In an embodiment, this user input could consist of holding down a modifier key and then clicking on a thumbnail. In an embodiment, multiple thumbnails are selected by holding down the COMMAND key and clicking the mouse pointer on each thumbnail to be selected. Other types of user input, well known in the art, may be utilized to select one or more thumbnails. This type of user input is contemplated for all embodiments as well.

Continuing with step 506, user input is received that places the system into a second mode of operation, or "compare" mode. In response to placing the system into the compare mode, the underlying digital images for all the selected thumbnails are displayed in the second portion of the screen. According to an embodiment, the images are automatically arranged and dynamically resized to maximize the size of the images within the available display area of the second portion, as illustrated in FIG. 2. According to an embodiment, the images are placed in proximity to one another to facilitate comparison.

In step 508, while in the second mode, the user may click on additional thumbnails. In response, the underlying images for the additionally-selected thumbnails are displayed in the second portion in addition to the currently-displayed images, and the currently-displayed images will be rearranged and resized to accommodate the newly-displayed images. According to an embodiment, the currently-displayed images "slide" into their new positions. This action may occur any number of times in response to user input.

In step 510 of FIG. 5, user input is received that switches from the compare mode back to the normal mode. According to an embodiment, this consists of clicking on the same GUI element used to enter compare mode, or any number of input variations. According to an embodiment, switching modes clears the second portion of all images and returns the display to the normal mode as illustrated in FIG. 1.

HARDWARE OVERVIEW

Figure 6:
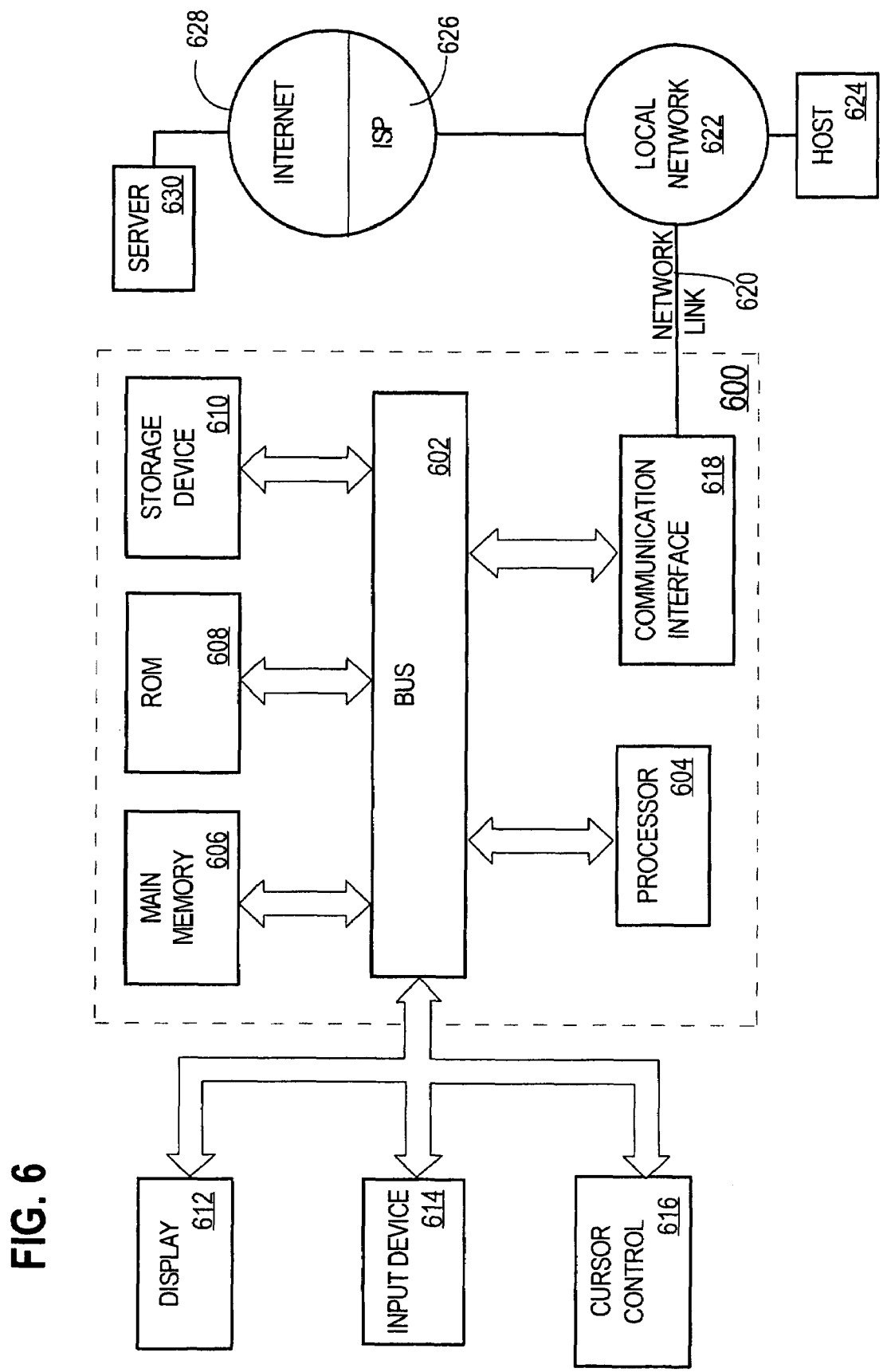
FIG. 6 is a block diagram of a computer system on which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code.

EXTENSIONS AND ALTERNATIVES

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

Further, in the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising performing a machine-executed operation involving stored instructions, wherein the machine-executed operation comprises:
   A) sending said instructions over transmission media;
   B) receiving said instructions over transmission media;
   C) storing said instructions onto a machine-readable storage medium; and
   D) executing the instructions;
   wherein said instructions are instructions which, when executed by one or more processors, cause the one or more processors to perform the steps of:
   displaying on the screen of a display device thumbnails of a plurality of digital images;
   receiving a first user input that selects a subset of said thumbnails, said subset including multiple thumbnails;
   displaying in a comparative mode on a portion of the screen a set of images, each image of the set corresponding to a digital image of a selected thumbnail in the subset of selected thumbnails;
   wherein the comparative mode comprises:
      positioning the each image of the set of images in proximity to each other; and
      while displaying said set of images in said comparative mode:
         receiving user input indicating a particular image manipulation on a selected image; and
         manipulating the selected image based on the user input.

2. The method of claim 1, further comprising automatically resizing the displayed images on the display.

3. The method of claim 1, wherein the positioning of the digital images includes automatically resizing to substantially equal dimensions the displayed images associated with the selected thumbnails.

4. The method of claim 1, wherein the displaying in a comparative mode further comprises providing a visual indicator of which thumbnails are being displayed.

5. The method of claim 1, wherein a portion of the screen on which the set of images are displayed comprises the entire screen of the display device.

6. The method of claim 1, further comprising:
   in response to user input, removing at least one of the images from the display while remaining in the comparative mode.

7. The method of claim 1, further comprising:
   in response to user input, switching the currently-selected image with another of the plurality of images without changing the number of images displayed.

8. The method of claim 1, wherein the visual indication comprises shading on or adjacent to the selected digital image.

9. The method of claim 1, wherein the displayed digital images are arranged in an evenly-spaced grid on the display.

10. The method of claim 1, wherein the first user input operates to initiate the comparative mode of operation upon selection of at least one of the thumbnails, and the images associated with the selected thumbnails are displayed in response to each subsequent instance of the first user input.

11. The method of claim 10, wherein the displaying comprises:
   a) positioning the images in proximity on the screen;
   b) shifting the previously-displayed images to make room for the newly-displayed images; and
   c) providing a visual indication indicating which of the images is currently selected for further manipulation the images are shifted on the display.

12. The method of claim 1, wherein the selected images may be manipulated while in the comparative mode of operation.

13. The method of claim 1, wherein the thumbnails are displayed on a portion of the screen separate from the portion of the screen containing the displayed digital images.

14. The method of claim 1, wherein:
   in response to user input, the thumbnails of a plurality of digital images are automatically displayed on a portion of the screen separate from the portion of the screen containing the displayed digital images; and
   in response to user input, the thumbnails are hidden from display.

15. The method of claim 1, wherein in response to user input, the images are removed from the display.

16. The method of claim 1, wherein the user input is one member selected from the group consisting of: one or more sequences of keystrokes, one or more sequences of mouse clicks, one or more sequences of keystrokes in combination with mouse clicks, input from a light pen, and input from a touch screen.

17. The method of claim 1, wherein the display device is a CRT.

18. The method of claim 1, wherein the display device is a projector.

19. The method of claim 1, wherein the display device comprises multiple display devices.

20. A method comprising performing a machine-executed operation involving stored instructions, wherein the machine-executed operation comprises:
   A) sending said instructions over transmission media;

B) receiving said instructions over transmission media;
C) storing said instructions onto a machine-readable storage medium; and
D) executing the instructions;
wherein said instructions are instructions which, when executed by one or more processors, cause the one or more processors to perform the steps of:
   displaying on a screen thumbnails of a plurality of digital images;
   receiving a first user input that selects a comparative mode of operation;
   while in the comparative mode of operation, receiving an instance of a second user input that selects at least one of the thumbnails; and
   in response to each instance of the second user input, displaying the images associated with the thumbnails selected by the instances of the second user input, wherein the displaying comprises:
      a) automatically resizing the displayed images; and
      b) positioning the images in proximity on the screen.

21. A method for comparing digital images, the method comprising the steps of:
   receiving a first user input that selects a comparative mode of operation;
   while in the comparative mode of operation, receiving an instance of a second user input that selects at least one of a group of thumbnails of a plurality of digital images;
   in response to each instance of the second user input, displaying the images associated with the thumbnails selected by the instance of the second user input, wherein the displaying comprises:
      a) automatically resizing the displayed images to equal dimensions, where the dimensions of each displayed image are relative to the number of displayed images and the area of the screen in which the images are displayed; and
      b) positioning the images in proximity on the screen; and
   in response to a third user input, switching out of the comparative mode and removing the images from the display.

22. A method for comparing digital images, the method comprising the steps of:
   in a first mode of operation, displaying thumbnails of a plurality of digital images on a first portion of the screen;
   in response to a first user input, selecting at least one of the thumbnails;
   in response to a second user input, initiating a comparative mode of operation wherein an associated digital image of each selected thumbnail is displayed on a second portion of the screen, the displaying comprising:
      a) automatically resizing the displayed images to a size relative to the number of displayed images and the area of the second portion of the screen; and
      b) positioning the images in proximity on the screen;
   in response to a third user input while in the comparative mode of operation, selecting at least one of the plurality of the thumbnails not already selected, causing the associated digital image of each thumbnail selected by the second and third user input to be displayed on the second portion of the screen with the images currently displayed in the second portion, the act of displaying comprising:
      a) automatically resizing the displayed images to a size relative to the number of displayed images and the area of the second portion of the screen; and
      b) positioning the images in proximity on the screen.

23. The method of claim 22, wherein the second portion of the screen is larger than the first portion.

24. The method of claim 22, wherein exiting the comparative mode of operation clears the display of the digital images.

25. The method of claim 22, further comprising the steps of:
   displaying a toolbar on the first portion of the screen, wherein the thumbnails of a plurality of digital images are displayed in the toolbar;
   while a pointer is over the toolbar, continuing to display the toolbar;
   when the pointer is moved off the toolbar, tracking idle periods, wherein each idle period is a period of time during which no input, of one or more types of the user input, is received;
   if, while the pointer is off the toolbar, an idle period exceeds a predetermined threshold duration, then hiding the toolbar.

26. The method of claim 25, further comprising the step of:
   if the toolbar is hidden during an idle period, then redisplaying the toolbar in response to the end of the idle period.

27. The method of claim 25, wherein the toolbar is a floating toolbar that does not have any boundary that is adjacent to any screen boundaries.

* * * * *